Patented June 24, 1930

1,765,681

UNITED STATES PATENT OFFICE

LEOPOLD LASKA AND ARTHUR ZITSCHER, OF OFFENBACH-ON-THE-MAIN, GERMANY, ASSIGNORS TO GENERAL ANILINE WORKS, INC., OF NEW YORK, N. Y., A CORPORATION OF DELAWARE

MANUFACTURE OF FAST AZODYESTUFFS

No Drawing. Application filed August 27, 1928, Serial No. 302,438, and in Germany September 5, 1927.

We have found that new and valuable azodyestuffs are obtained by combining the diazocompound of 2.4.5-trichloroaniline with any arylamide of the 2-hydroxy-3-naphthoic acid.

The new dyestuffs correspond probably to the general formula:

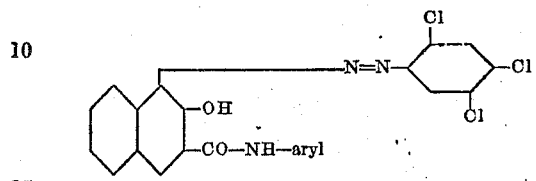

wherein the aryl residue may contain further substituents. They are when dry reddish to brownish powders, soluble in concentrated sulfuric acid with a reddish-violet to bluish violet tint. They are especially fast to light and therefore outstanding among the preferably fast dyestuffs of this class. The new dyestuffs may be used for manufacturing valuable color lakes as well as for producing fast dyeings and printings on the vegetable fiber.

In order to further illustrate our invention the following examples are given, the parts being by weight and all temperatures in centigrade degrees; but we wish to be understood that our invention is not limited to the examples given, nor to the exact conditions stated therein.

Example 1

19.7 parts of 2.4.5-trichloraniline are diazotized in the usual manner and the diazosolution is combined with a solution of 30.8 parts of 2'-hydroxy-3'-naphthoyl-2-amino-1-anisole in a dilute caustic soda solution, containing Turkey red oil and a sufficient amount of sodium acetate for neutralizing the excess of the mineral acid. The separated dyestuff corresponding probably to the formula:

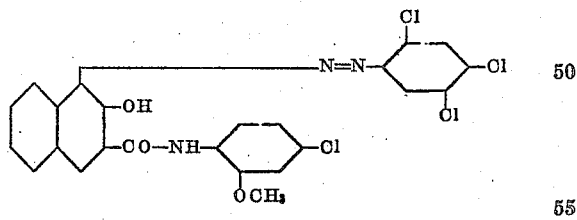

is filtered off and well washed. It represents when dry a dark powder and dissolves in concentrated sulfuric acid with a reddish-violet tint. It may be advantageously used in the form of a paste and yields, when mixed with a substratum in the usual manner, a clear yellowish red lake of an excellent fastness to light.

In order to produce a dyestuff of this kind on the fiber one may proceed as follows:

Example 2

Well boiled and dried cotton yarn is impregnated with a solution, containing 6 grs. of 2'-hydroxy-3'-naphthoyl-5-chloro-2-amino-1-anisole, 12 cc. of a caustic soda solution of 34° Bé. and 8 cc. of Turkey red oil per liter, well wrung out and developed with a diazosolution containing 4 grs. of 2.4.5-trichloraniline and being neutralized with sodium acetate. Then it is rinsed, soaped and dried.

In this manner a yellowish red dying of an excellent fastness to light is obtained. The dyestuff thus produced on the fiber corresponds probably to the formula:

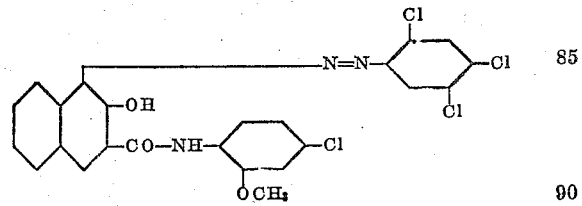

In the same way our process is carried out when starting from other 2-hydroxy-3-naphthoic acid aryl amides.

The new dyestuffs may also be prepared by the printing process according to one of the usual methods.

The following table shows the shades of some dyeings produced according to our invention by combining the diazocompound of 2.4.5-trichloraniline with:

| | |
|---|---|
| 2'-hydroxy-3'-naphthoyl-α-naphthylamine | Claret red |
| 2'-hydroxy-3'-naphthoyl-p-anisidine | Red |
| 2'-hydroxy-3'-naphthoyl-aminohydroquinone-dimethylether | Yellowish red |
| 2'-hydroxy-3'-naphthoyl-4-chloro-2-anisidine | Yellowish red |
| 2'-hydroxy-3'-naphthoyl-5-chloro-2-toluidine | Yellowish red |
| bis-[2'-hydroxy-3'-naphthoyl]-dianisidine | Brown |
| 2'-hydroxy-3'-naphthoyl-aniline | Yellowish scarlet |
| 2'-hydroxy-3'-naphthoyl-β-naphthylamine | Covered red |
| 2'-hydroxy-3'-naphthoyl-p-phenetidine | Brownish red |
| 2'-hydroxy-3'-naphthoyl-o-chloroaniline | Yellowish scarlet |
| 2'-hydroxy-3'-naphthoyl-m-chloroaniline | Yellowish red |
| 2'-hydroxy-3'-naphthoyl-p-chloroaniline | Yellowish red |
| 2'-hydroxy-3'-naphthoyl-m-toluidine | Yellowish red |
| 6'-bromo-2'-hydroxy-3'-naphthoyl-2-amino-5-chloro-hydroquinone-dimethylether | Copper red |

We wish it to be understood the term "manufacturing" in the following claims means manufacturing in substance as well as manufacturing on any substratum especially on the vegetable fiber.

We claim:

1. As new compounds azodyestuffs corresponding probably to the general formula:

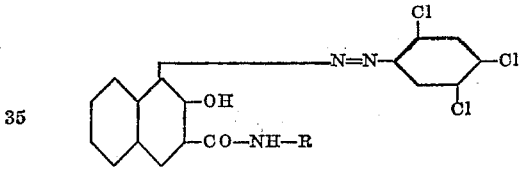

wherein R means a residue of the benzene or naphthalene series which may contain further substituents, which compounds are when dry reddish to brownish powders, soluble in concentrated sulfuric acid with a reddish-violet to bluish violet tint, being suitable for the production of valuable color lakes and yielding, when produced on the vegetable fiber, dyeings and printings of an excellent fastness to light.

2. Textile material dyed with the dyestuffs claimed in claim 1, said dyestuffs being produced on the vegetable fiber.

3. As new compounds azodyestuffs corresponding probably to the general formula:

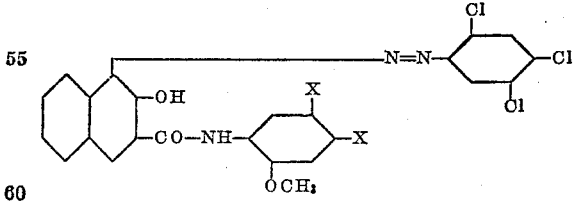

which compounds are when dry reddish to brownish powders, soluble in concentrated sulfuric acid with a reddish-violet to bluish-violet tint, being suitable for the production of valuable color-lakes and yielding, when produced on the vegetable fiber, dyeings and printings of an excellent fastness to light.

4. Textile material dyed with the dyestuffs claimed in claim 3, said dyestuffs being produced on the vegetable fiber.

5. As a new compound the azodyestuff corresponding probably to the formula:

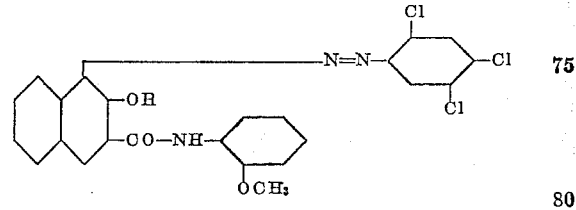

which compound is a dark powder soluble in concentrated sulfuric acid with a reddish-violet tint, being suitable for the production of valuable color lakes and yielding, when produced on the vegetable fiber, yellowish-red dyeings and printings of an excellent fastness to light.

6. Textile material dyed with the dyestuffs claimed in claim 5, said dyestuffs being produced on the vegetable fiber.

In testimony whereof, we affix our signatures.

LEOPOLD LASKA.
ARTHUR ZITSCHER.

Certificate of Correction

Patent No. 1,765,681.            Granted June 24, 1930, to

LEOPOLD LASKA ET AL.

It is hereby certified that error appears in the printed specification of the above numbered patent requiring correction as follows:

Page 1, lines 50 to 55, strike out the formula and insert instead

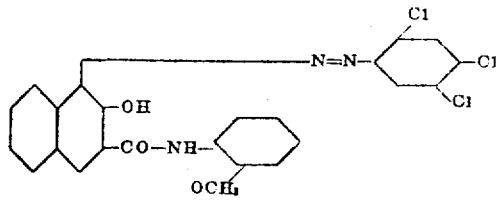

page 2, line 61, claim 3, after the formula insert *wherein the X's mean hydrogen or one X chlorine;* and that the said Letters Patent should be read with these corrections therein that the same may conform to the record of the case in the Patent Office.

Signed and sealed this 2d day of September, A. D. 1930.

[SEAL.]

M. J. MOORE,
*Acting Commissioner of Patents.*